US009397937B2

(12) United States Patent
Sugihara

(10) Patent No.: US 9,397,937 B2
(45) Date of Patent: Jul. 19, 2016

(54) COMPUTER SYSTEM, SERVER, OPEN FLOW CONTROLLER AND COMMUNICATION METHOD

(75) Inventor: Tomoaki Sugihara, Tokyo (JP)

(73) Assignee: NEC Corporation, Tokyo (JP)

( * ) Notice: Subject to any disclaimer, the term of this patent is extended or adjusted under 35 U.S.C. 154(b) by 368 days.

(21) Appl. No.: 14/003,782

(22) PCT Filed: Feb. 17, 2012

(86) PCT No.: PCT/JP2012/053773
§ 371 (c)(1),
(2), (4) Date: Sep. 6, 2013

(87) PCT Pub. No.: WO2012/120990
PCT Pub. Date: Sep. 13, 2012

(65) Prior Publication Data
US 2013/0343393 A1 Dec. 26, 2013

(30) Foreign Application Priority Data
Mar. 9, 2011 (JP) ................. 2011-052130

(51) Int. Cl.
H04L 12/741 (2013.01)
H04L 12/801 (2013.01)
H04L 12/721 (2013.01)
H04L 12/715 (2013.01)
H04L 12/717 (2013.01)

(52) U.S. Cl.
CPC ............. H04L 45/74 (2013.01); H04L 45/38 (2013.01); H04L 45/42 (2013.01); H04L 45/64 (2013.01); H04L 47/193 (2013.01); G06F 2213/0038 (2013.01)

(58) Field of Classification Search
None
See application file for complete search history.

(56) References Cited

U.S. PATENT DOCUMENTS

| 6,119,171 | A | 9/2000 | Alkhatib | |
|---|---|---|---|---|
| 6,430,623 | B1 | 8/2002 | Alkhatib | |
| 6,772,227 | B2 | 8/2004 | Alkhatib | |
| 7,386,622 | B2 | 6/2008 | Tanaka | |
| 2002/0184390 | A1* | 12/2002 | Alkhatib | ...................... 709/245 |
| 2005/0076167 | A1 | 4/2005 | Tanaka | |

(Continued)

FOREIGN PATENT DOCUMENTS

| CN | 1289494 A | 3/2001 |
|---|---|---|
| JP | 11-239163 A | 8/1999 |

(Continued)

OTHER PUBLICATIONS

Japanese Office Action dated Aug. 29, 2014 with a partial English translation thereof.

(Continued)

Primary Examiner — Steven H Nguyen
(74) Attorney, Agent, or Firm — McGinn IP Law Group, PLLC

(57) ABSTRACT

In a computer system according to the present invention, a host sends a packet in which protocol information above a TCP layer and within a transport layer is included in an option area of a TCP header. An open flow controller set a flow entry wick defines a forwarding destination corresponding to the protocol information, in a switch. An open flow switch forwards the received packet toward a forwarding destination which corresponds to the protocol information included in the TCP header of the received packed. As a result, an adaptation of the computer system is increased.

13 Claims, 12 Drawing Sheets

(56) References Cited

U.S. PATENT DOCUMENTS

| | | |
|---|---|---|
| 2005/0086444 A1 | 4/2005 | Tanaka |
| 2008/0049621 A1* | 2/2008 | McGuire et al. ........... 370/236.2 |
| 2009/0138613 A1 | 5/2009 | Tanaka |
| 2011/0261825 A1 | 10/2011 | Ichino |

FOREIGN PATENT DOCUMENTS

| | | |
|---|---|---|
| JP | 2002-502188 A | 1/2002 |
| JP | 2004-080487 A | 3/2004 |
| JP | 2005-110118 A | 4/2005 |
| JP | 2005-151437 A | 6/2005 |
| JP | 2006-129487 A | 5/2006 |
| WO | WO 2010/103909 A1 | 9/2010 |

OTHER PUBLICATIONS

Japanese Office Action dated Dec. 2, 2014 with a partial English translation.

Fulu Li, "An Empirical Study of Today's Internet Traffic for Differentiated Services IP QoS," Computers and Communications, 2000. Proceedings. ISCC 2000. Fifth IEEE Symposium on, IEEE, Jul. 2000, p. 207-213, URL, http://ieeexplore.ieee.org/xpls/abs_all.jsp?arnumber=860640&tag=1.

Chinese Office Action dated May 5, 2015 with an English translation thereof.

"OpenFlow Switch Specification version 0.9.0A (Wire Protocol 0x98)", pp. 1-2, Jul. 20, 2009.

International Search Report in PCT/JP2012/053773 dated Mar. 13, 2012 (English Translation Thereof).

"Openflow Switch Specification, Version 1.0.0", [online], the Internet (URL: http://www.openflowswitch.org/documents/openflow-spec-v1.0.0.pdf), Dec. 31, 2009.

Hiroshi Ueno, "A Study on Deployment of Network Appliance Functionalities in Datacenter Network"IEICE Technical Report, vol. 109, No. 296, Nov. 13, 2009, pp. 7 to 12.

English translation of PCT/ISA/237 (written opinion of the international searching authority, dated Mar. 13, 2012).

PCT/IB/373 dated Sep. 10, 2013.

Extended European Search Report dated Nov. 7, 2014.

Jerry Daugherty, "White Paper-Understanding iSCSI Digests: Accurately Evaluating the Cost and Risk of Disabling Digests", Sep. 30, 2009, XP055149939, p. 1-4.

\* cited by examiner

COMPUTER SYSTEM, SERVER, OPEN FLOW CONTROLLER AND COMMUNICATION METHOD

TECHNICAL FIELD

The present invention relates to a computer system and a communication method, and particularly relates to a flow control method in a computer system using an open flow protocol.

BACKGROUND ART

Demands for high-speed and high-capacity auxiliary storage devices are increasing. Especially, in a large-scale computer, many configurations are used, in which a storage (a disk array) assembled by storage devices is connected with SAN (Storage Area Network; a memory area network).

Among SANs, an SAN employing an iSCSI (Internet Small Computer System Interface) is attracting attention as a developing market, since a device cost is relatively low and existing infrastructures can be effectively utilized.

For example, a technology about SAN using the iSCSI is disclosed in Japanese Laid Open Patent Application (JP 2005-151437 (patent literature 1). In a system described in patent literature 1, information indicating that an SCSI command is encapsulated is stored in a header of a TCP (Transmission Control Protocol) packet, and whether the SCSI command is encapsulated or not can be judged without extracting the SCSI command, by reference to this information.

Since the iSCSI uses a TCP/IP technology at a layer below the SCSI protocol, the inventor expects that flow control with a high adaptation (flexibility) is attained by applying an open flow protocol to a system employing the iSCSI.

The open flow protocol is a method of controlling a route by a unit flow, and suggested by OpenFlow Consortium (refer to non-patent literature 1). In the open flow protocol, a series of communications from one point to another point are defined as "a flow", which is determined by a combination of a MAC address, an IP address, and a port number or the like. When the open flow protocol is employed, the route can be changed for each of flows, instead of uniformly being determined based on information about a source and a destination. Moreover, the route is controlled end to end, not only between adjacent devices.

However, currently, in the OSI Reference Model, a switch (hereinafter, referred to as an open flow switch) is able to treat only layers from the layer 1 to the TCP layer of the layer 4, and is not able to treat the iSCSI layer which is above those layers. Though the iSCSI layer is within the layer 4 in the OSI Reference Model, since the iSCSI layer is above the TCP layer, the open flow switch is not able to recognize it. Accordingly, current open flow system cannot carry out flow control using an SCSI name (an initiator name or a target name) of the iSCSI layer.

In order to carry out a flow control more flexibly, the open flow switch is preferably able to treat information about the iSCSI layer. Especially, if the open flow switch is able to treat the iSCSI name, usefulness is increased because the flow control is carried out based on the iSCSI name. On the other hand, if the flow control using the iSCSI name is not possible, since the flow is not controlled for each of initiators or targets, it is difficult to construct a network having large adaptation and effectively use a logical disk in the SAN.

On the other hand, for example, technologies about flow control which uses the TCP are described in Japanese Laid Open Patent Application JP 2006-129487 (refer to patent literature 2) and Japanese Laid Open Patent Application (JP-Heisei 11-239163 (refer to patent literature 3). In patent literature 2, a system is described, which uses an option field of a TCP packet to distinguish a terminal which is connected to a server. Moreover, in patent literature 3, a technology is described in which a switch carries out flow control between LANs.

CITATION LIST

Patent Literature

[Patent literature 1] Japanese Laid Open Patent Application (JP-P 2005-151437)
[Patent literature 2] Japanese Laid Open Patent Application (JP-P 2006-129487)
[Patent literature 3] Japanese Laid Open Patent Application (JP-Heisei 11-239163)

Non-Patent Literature

[Non-patent literature 1] OpenFlow Switch Specification Version 1.0.0 (Wire Protocol 0x01) Dec. 31, 2009

SUMMARY OF THE INVENTION

As mentioned above, one object of the present invention is to increase an adaptation of a computer system.

Another object of the present invention is to provide a computer system which is able to carry out flow control based on a protocol above the TCP layer.

A computer system according to the present invention includes: an open flow controller; an open flow switch carrying out a relaying operation defined by a flow entry set by the open flow controller, for a received packet which complies with the flow entry; and a host connected to the open flow switch. The host sends a packet in which protocol information above TCP layer and within a transport layer is included in an option area of TCP header. The open flow controller sets a flow entry which defines a forwarding destination, in the switch. The open flow switch forwards the received packet to the forwarding destination according to the flow entry which complies with the protocol information included in the TCP header of the received packet.

A communication method according to the present invention includes: sending a packet in which protocol information above a TCP layer and within a transport layer is included in a TCP header, by a host; setting a flow entry, which defines a forwarding destination corresponding to the protocol information, in a switch, by an open flow controller; and forwarding a received packet complying with the flow entry set by the open flow controller to a destination according to the flow entry complying with the protocol information included in the TCP header of the received packet, by the open flow switch.

According to the present invention, an adaptation of a computer system can be increased.

Moreover, flow control according to a protocol above TCP layer can be realized.

BRIEF DESCRIPTION OF THE DRAWINGS

The above and other objects, advantages, and features of the invention will be more apparent from description of embodiments in conjunction with the accompanying drawings in which.

DESCRIPTION OF EXEMPLARY EMBODIMENTS

Figure 1:
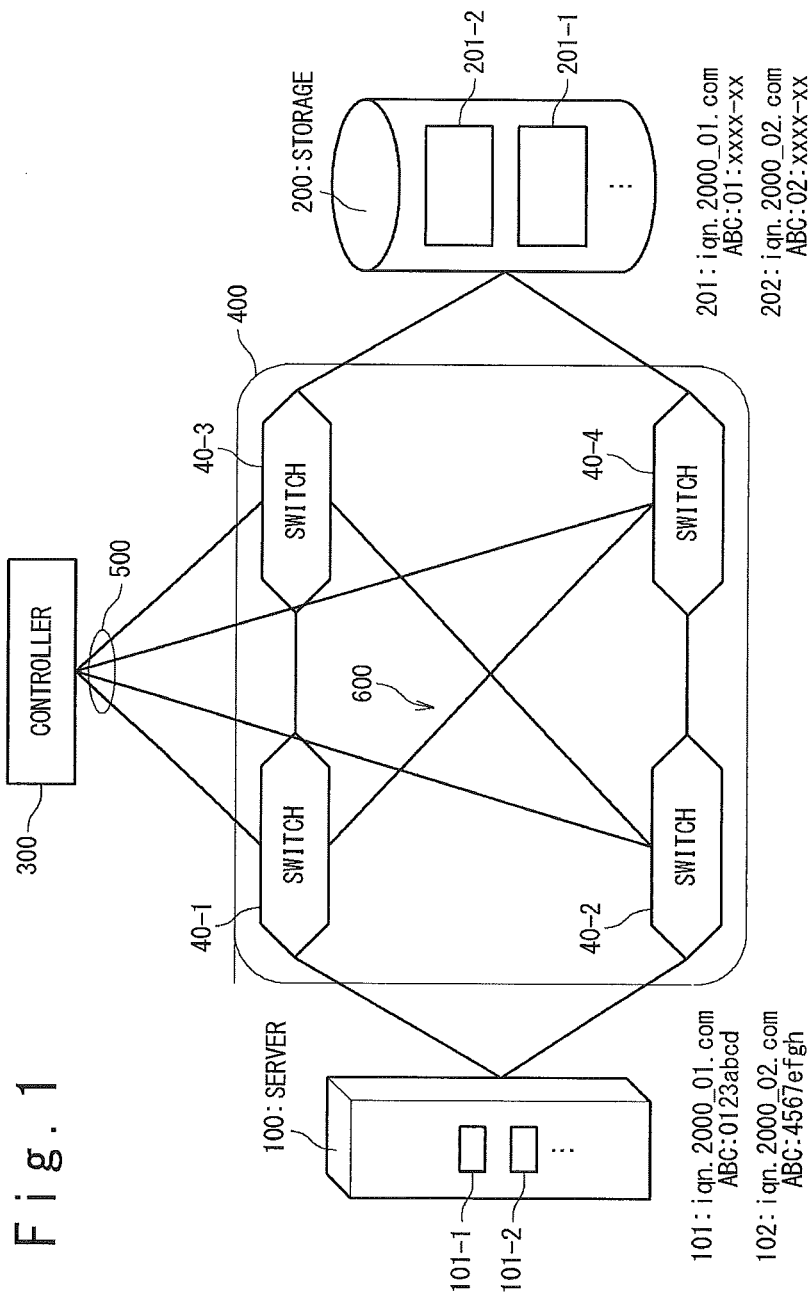
FIG. 1 is a diagram showing one example of a configuration of a computer system according to the present invention.

Hereinafter, embodiments according to the present invention will be explained with reference to the attached drawings. In the drawings, same or similar reference numerals denote the same, similar or equivalent components. When there is a plurality of similar components, an additional number is added to the reference numeral. When the components are described without being distinguished, an additional number is not added to the reference numeral.

(Overview)

An initiator according to the present invention forwards a packet data (packet), in which protocol information (for example, an iSCSI name) within the layer 4 (transport layer) and above the TCP layer is stored in an option area of a TCP header. An open flow controller (hereinafter, referred to as a controller) sets a flow entry having the protocol information above the TCP layer as a rule, in an open flow switch (hereinafter, referred to as a switch). The open flow switch (hereinafter, referred to as the switch) references to the TCP header of a received packet to forward the received packet toward a forwarding destination which is defined by a flow entry corresponding to the header. As a result, a computer system according to the present invention is able to control a flow defined by protocol information above TCP layer, and realizes flow control having high adaptation (flexibility). In the following example, a computer system will be explained, which uses the iSCSI name as the protocol information to carry out flow control.

(Configuration of a Computer System)

With reference to FIGS. 1 to 9, one example of a configuration of a computer system according to the present invention will be explained. FIG. 1 is a diagram showing one example of a configuration of a computer system according to the present invention. With reference to FIG. 1, the computer system according to the present invention includes a server 100 (a host), a storage 200 (a storage device, a host), a controller 300, and a switch network 400 formed by a plurality of switches 40-1 to 40-4. For example, the server 100 and the storage 200 form an SAN by being connected through the switch network 400 which is connected via lines 600 (for example, Ethernet (registered trademark) LAN).

Server 100 is a computer device which includes initiators 101-1, 101-2, . . . . Each of the initiators 101-1, 101-2, . . . , may be realized by a software, a hardware, or a combination of both. The initiator 101 is illustrated by an iSCSI initiator having an SCSI device driver such as a network card (Network Interface Card NIC). The initiator 101 encapsulates an SCSI command or SCSI data in a TCP packet to send to a target 201. At this time, the packet forwarded to the target 201 by the initiator 101 stores protocol information within the layer 4 and above the TCP layer, in an option area of the TCP header.

The Storage 200 is a storage device which includes targets 201-1, 201-2, . . . . Each of the targets 201-1, 201-2, . . . may be realized by a software, a hardware, or a combination of both. For example, the target is a storage device such as a logical disk. The target 201 encapsulates a response to the SCSI command into a TCP packet and sends it to the initiator 101. At this time, the packet forwarded to the initiator 101 by the target 201 stores protocol information within the layer 4 and above the TCP layer, in the option area of the TCP header.

Figure 2:
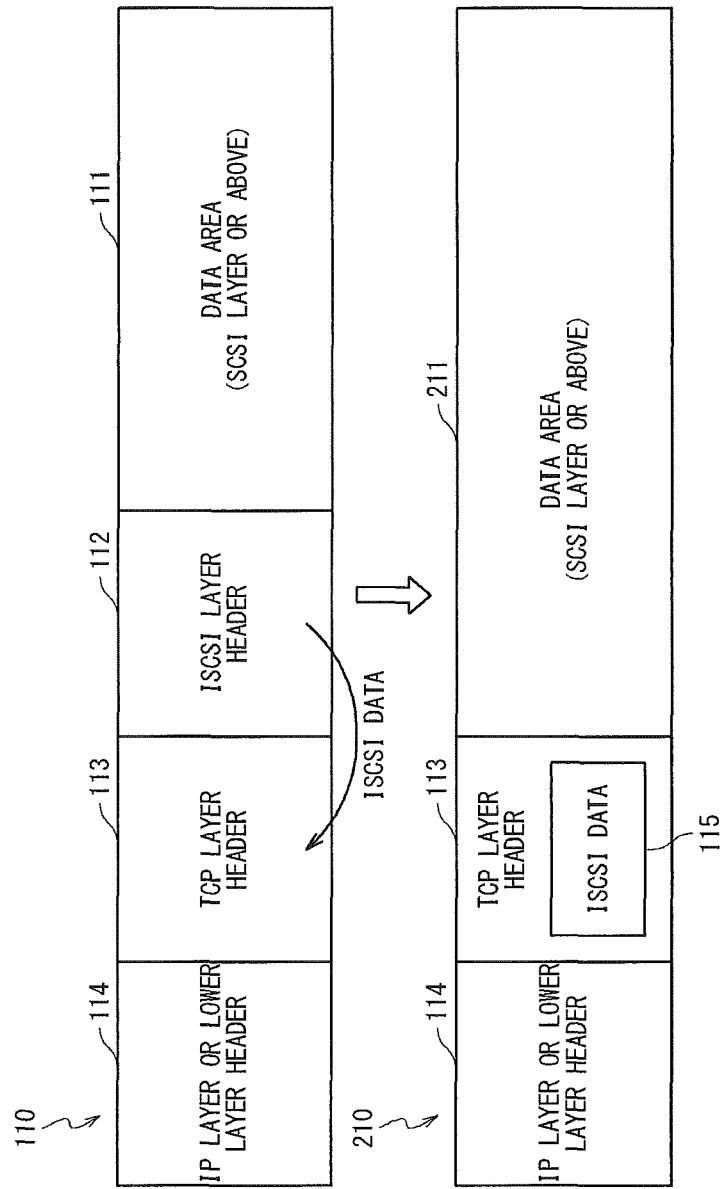
FIG. 2 is a diagram showing one example of a configuration of a packet generated and forwarded by an initiator or a target.

FIG. 2 is a diagram showing one example of a configuration of a packet which is generated and forwarded by the initiator or the target according to the present invention. Here, a configuration of a packet according to the iSCSI protocol will be illustrated. With reference to FIG. 2, a packet 110 is a conventional packet, and a packet 210 is a packet generated and forwarded by the initiator 101 or the target 201 according to the present invention. The packet 110 is a PDU (Protocol Data Unit) having a header of the layer 2, and includes a data area 111 within or above the SCSI layer (above the TCP layer), a header area 112 of the iSCSI layer (hereinafter, referred to as an iSCSI layer header 112), a header area 113 of the TCP layer (hereinafter, referred to as a TCP layer header 113), and a header area 114 within or below an IP layer (hereinafter, referred to as an IP layer header 114). The initiator 101 or the target 201 records information concerning the iSCSI protocol (iSCSI information 115, for example: an SCSI name), which is supposed to be stored in the iSCSI layer header 112 in the conventional packet 110, in the TCP layer header 113, and sends it as the packet 210. At this time, the iSCSI layer header 112 and the data area 111 of the packet 110 are used as a data area 211 within or above the iSCSI layer (above TCP layer) in the packet 210. As a result, the packet 210 is forwarded to the switch network 400 as PDU including the TCP layer header 113, the IP layer header 114, and the data area 211 within or above the iSCSI layer (above TCP layer).

Here, as the iSCSI information 115, an iSCSI name is preferable, which is used for recognizing and controlling an iSCSI node (for example, the initiator 101 or target 201). The iSCSI name is uniquely assigned to the iSCSI node, without depending on a location of the iSCSI node. In the SCSI protocol, an iSCSI Qualified Name, which uses an IP domain name, and an IEEE EUI-64 Format using 64 bit Extended Unique Identifier of IEEE are utilized. For example, the iSCSI information 115 is formed by a text in which a type identifier "iqn.", a domain acquiring date, a domain name, and a domain acquirer are added.

Though only the initiator 101 is provided in the server 100 in the configuration shown in FIG. 1, a configuration having a function of a target (for example, a network adapter) is preferably provided. Moreover, though only the target 201 is provided in the storage 200 in the configuration shown in FIG. 1, a configuration having a function of an initiator (for example, a network adapter) is preferably provided.

Figure 3:
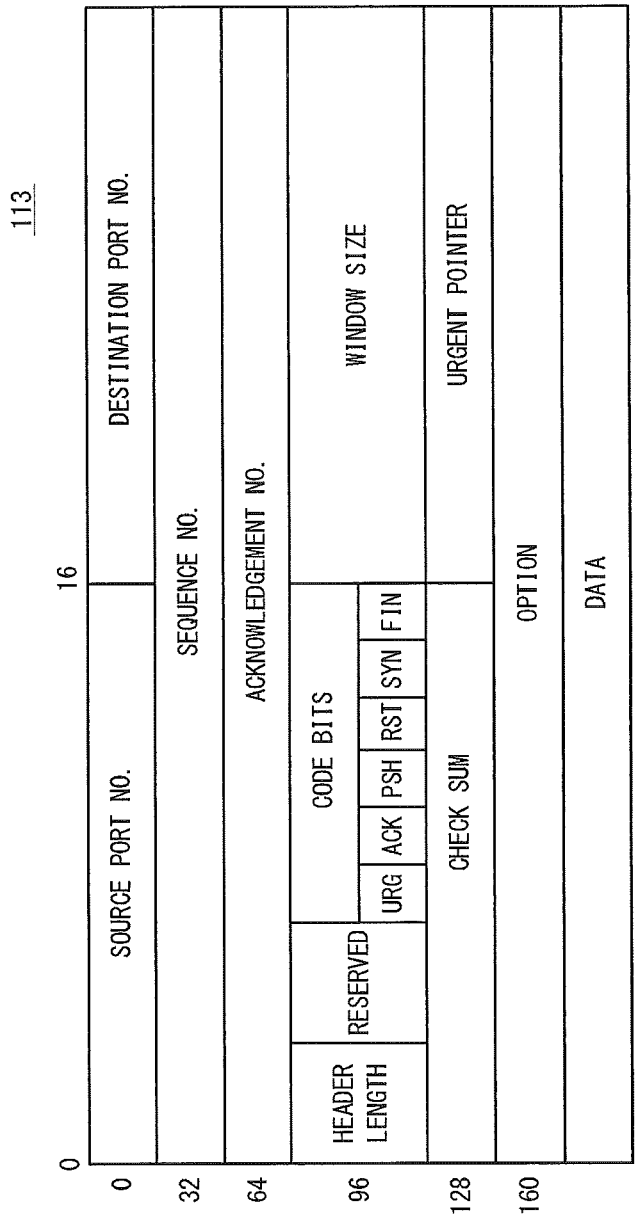
FIG. 3 is a diagram showing a data design of a general TCP packet.

FIG. 3 is a diagram showing a data design of a general TCP packet. With reference to FIG. 3, the TCP layer header 113 includes fields, in which a source port number, a destination port number, a sequence number, an acknowledgement number, a header length, code bits (URG,ACK,PSH,RST,SYN, FIN), a window size, check sum, an urgent pointer, an option, and data are stored. Here, the field in which the option is stored (hereinafter, referred to as an option area) is generally a field with variable length from 160 bytes which are used for setting a characteristic of TCP connection, however, according to the present invention, the option area is used for storing the iSCSI information 115. Preferably, in the option area of the TCP layer header 113, the iSCSI information 115 is stored for each of TCP connections.

Figure 4A:
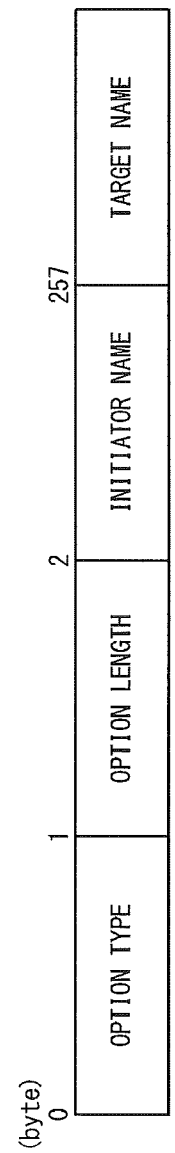
FIG. 4A is a diagram showing one example of a data design of ISCSI information stored in an option area of a TCP header according to the present invention.
Figure 4B:
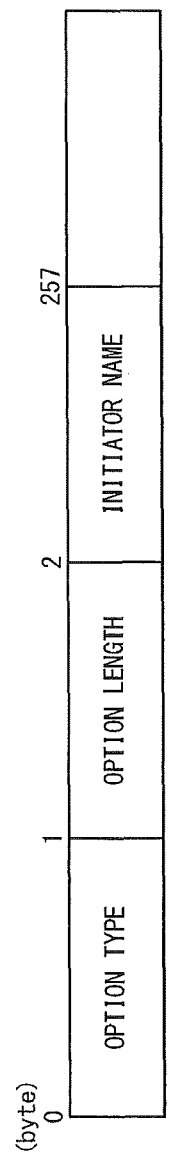
FIG. 4B is a diagram showing another example of a data design of ISCSI information stored in an option area of a TCP header according to the present invention.
Figure 4C:
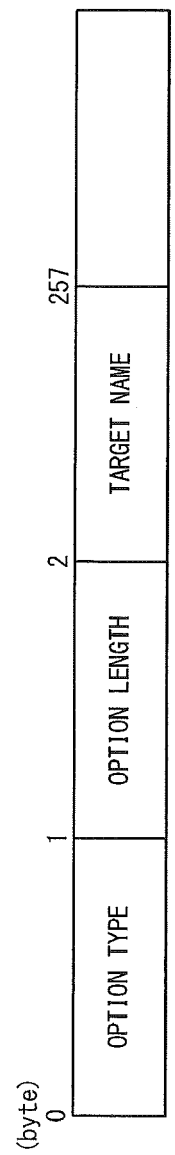
FIG. 4C is a diagram showing further another example of a data design of ISCSI information stored in an option area of a TCP header according to the present invention.

FIG. 4 is a diagram showing one example of a data design of the iSCSI information which is stored in the option area of the TCP header according to the present invention. FIG. 4A indicates a data design of the option area when an initiator name and a target name are stored as the iSCSI information 115. FIG. 4B indicates a data design of the option area when only the initiator name is stored as the iSCSI information 115. FIG. 4C indicates a data design of the option area when only the target name is stored as the iSCSI information 115.

As an option type, either of "30 to 252" which are currently not defined is preferably used. In the present embodiment, it is assumed that "151" is used.

An option length indicates total size of the option area which includes areas of the option type and option length, and typically indicates 512 bytes. Each of the option type and the option length is 1 byte. With reference to FIG. 4A, a size of each of the initiator name and the target name stored as the iSCSI information 115 is 255 bytes. When the iSCSI name (the initiator name or the target name) is less than 255 bytes, within an area of 255 bytes from a termination of the option length, an empty area in which the iSCSI name is not stored is padded with "0x00" (0 padding). Similarly, within an area of 255 bytes further from a termination of the 255 bytes area in which the iSCSI name and "0x00" are stored, an empty area in which the iSCSI name is not stored is padded with "0x00". When each of the initiator name and the target name is 255 bytes, 0x00 is not inserted as termination.

With reference to FIG. 4B, a size of the initiator name stored as the iSCSI information 115 is 255 bytes, and the empty area (255 bytes) is padded with 0x00. With reference to FIG. 4C, a size of the target name stored as the iSCSI information 115 is 255 bytes, and the empty area (255 bytes) is padded with "0x00". Similarly, when the iSCSI name (the initiator name or the target name) is less than 255 bytes, the empty area is padded with "0x00". In an operation according to the present embodiment, both of two types of iSCSI name are stored.

The controller 300 is connected with each of the plurality of switches 40-1 to 40-4 through a control interface 500 which is a secure channel network. The controller 300 sets a flow entry in each of the plurality of switches 40-1 to 40-4 according to an open flow protocol to control a communication flow between the server 100 and the storage 200 through some of the plurality of switches 40-1 to 40-4. Moreover, for example, by setting a flow entry having protocol information above the TCP layer as a rule in the switch 40, the controller 300 according to the present invention is able to control a flow between the initiator and the target.

The controller 300 controls a construction of a communication route in which packets are forwarded and an operation of forwarding packets in a system, by the open flow technology. Here, the open flow technology means a technology, in which the controller 300 sets route information for a multi layer and a flow in the switch 40 on the communication route, according to a routing policy (flow entry: flow+action), and controls a route or a node (refer to non-patent literature 1 for details). By this, a route control function is separated from a router and the switch, and optimum routing and traffic managements are realized by integrated control of the controller. The switch 40 to which the open flow technology is applied treats a communication as a flow with END2END, not on a packet or frame basis like a conventional router and a switch.

Figure 5:
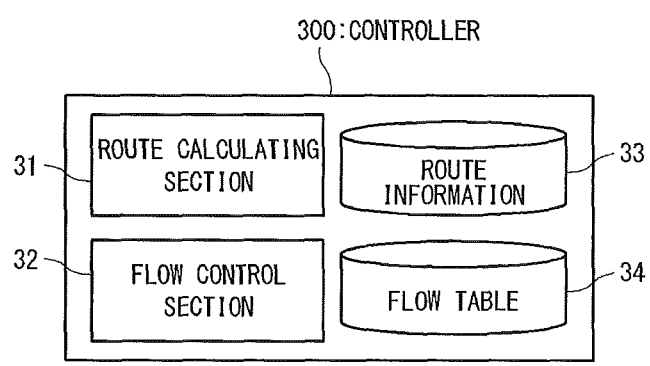
FIG. 5 is a diagram showing one example of a configuration of an open flow controller according to the present invention.

With reference to FIG. 5, details of a configuration of the controller 300 according to the present invention will be explained. Preferably, the controller 300 is realized by a computer including a CPU and a storage device. In the controller 300, functions of a route calculating section 31 and a flow control section 32 shown in FIG. 5 are realized by the CPU (not shown) executing a program stored in a storage device. Moreover, the controller 300 records rout information 33 and a flow table 34 in a storage device which is not illustrated.

Moreover, the controller 300 retains information concerning a location of the switches 40 to be controlled and a connection status, as topology information. For example, the topology information includes information concerning each of connection states between the ports of the switches 40 and the host (for example, the server 100 or the storage 200).

Route calculating section 31 calculates a communication route for transferring a packet, based on the topology information which is not illustrated and header information of a first packet which is notified from the switch 40. The calculation result is recorded as route information 33, in the storage device which is not illustrated. In this case, information is set for specifying nodes which are ends of the communication route (for example, the initiator and target), and the switches arranged on the communication route.

Figure 6:
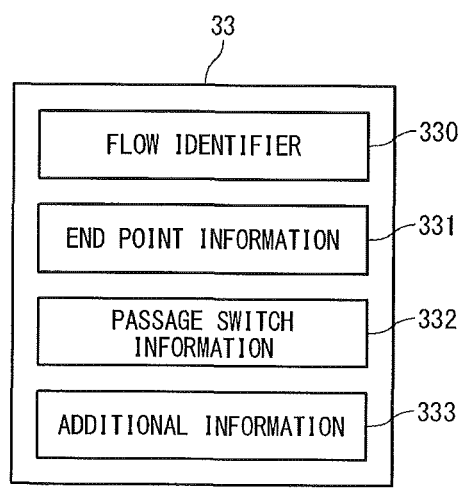
FIG. 6 is a diagram showing one example of a configuration of route information set in an open flow controller according to the present invention.

FIG. 6 is a diagram indicating one example of a configuration of route information 33 which is set in the open flow controller according to the present invention. With reference to FIG. 6, the rout information 33 specifies a communication route to which an after mentioned flow entry (rule+action) is applied, and includes passage switch information 332, additional information 333, and end point information 331 which is recorded with being associated with a flow identifier 341 that is associated with a flow entry. The end point information 331 is information for specifying nodes that are end points of the communication route. The passage switch information 332 is information for specifying a pair of connection ports between the switch 40 and a switch on the communication route. The additional information 333 includes information about the switches 40 (a passage switch) on a route after the end points are changed. For example, when the communication route is a route connecting between nodes, a pair of MAC addresses of both end points of the communication route is recorded as the end point information 331. The passage switch information 332 includes an identifier of the switch (for example, DataPath ID:DPID) which is provided on the communication route between the end points indicated by the end point information 331. Furthermore, the passage switch information 332 may include information for associating a flow entry (rule+action) set in a switch with this switch.

A flow control section 32 carries out setting, changing, and deleting the flow entry (rule+action), in the switch 40 on the calculated communication route, by Modify Flow Entry Message. Thus, the switch 40 executes an action (for example, relay or cancel of the packet data) which corresponds to the rule according to the header information of the received packet. The flow control section 32 sets a flow entry for the switch 40, in accordance with a notice of the first packet from the switch 40. Although, setting of the communication route, and setting and management of the flow entry by the flow control section 32 is carried out in accordance with the open flow protocol described in patent literature 1, a part of an after mentioned operation (for example, configuration in which the rule is protocol information above the TCP layer) is not defined by this protocol.

In the rule set in the flow entry, for example, a combination of addresses and identifiers from the layer 1 to 4 of the OSI (Open Systems Interconnection) reference model is defined, which is included in the header information of the packet data of TCP/IP. For example, as the rule, a combination of either of a physical port of the layer 1, a MAC address of the layer 2, an IP address of the layer 3, a port number of the layer 4, and a VLAN tag (VLAN id) is set.

Moreover, the flow control section 32 according to the present invention further sets the protocol information which is above TCP layer and within the transport layer, as the rule defined by the flow entry. For example, iSCSI names (the initiator name, the target name) in the iSCSI layer are set as the rule, independently or in combination with the above mentioned addresses or identifiers.

For example, in an action set in the flow entry, a method for processing a packet data of TCP/IP is defined. For example, information indicating whether or not the received packet data is to be relayed, and the destination (for example, destination port number of the packet) in a case of relaying are set. Further, as the action, information indicating copy or cancel of the packet data may be set.

Figure 7:
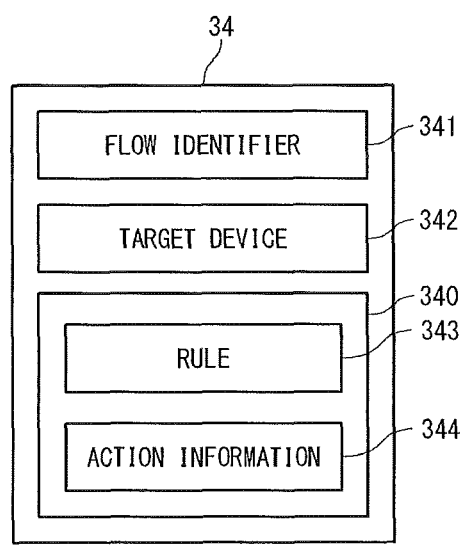
FIG. 7 is a diagram showing one example of a configuration of a flow table set and managed in an open flow controller according to the present invention.

The flow entry to be set (or set) in the switch 40 is recorded in the flow table 34 by the flow control section 32, and is managed by the controller 300. FIG. 7 is a diagram showing one example of a configuration of the flow table 34 which is set and managed by the controller according to the present invention. In the flow table 34, an target device 342 for indicating an identifier (for example, DPID) of the switch 40 which is to be a target, and a flow entry 340 to be set in this switch 40 are recorded with being associated with a flow identifier 341 that identifies the flow entry. In the flow entry 340, a rule 343 and action information 344 are set. The flow control section 32 is able to recognize what type of flow entry is set in the switch 40, by referencing to the flow table 34. Moreover, even though not shown in FIG. 4, the flow entry 34 may include information indicating whether or not the flow entry 340 is set in the switch 40 that is the target device 342.

Figure 8:
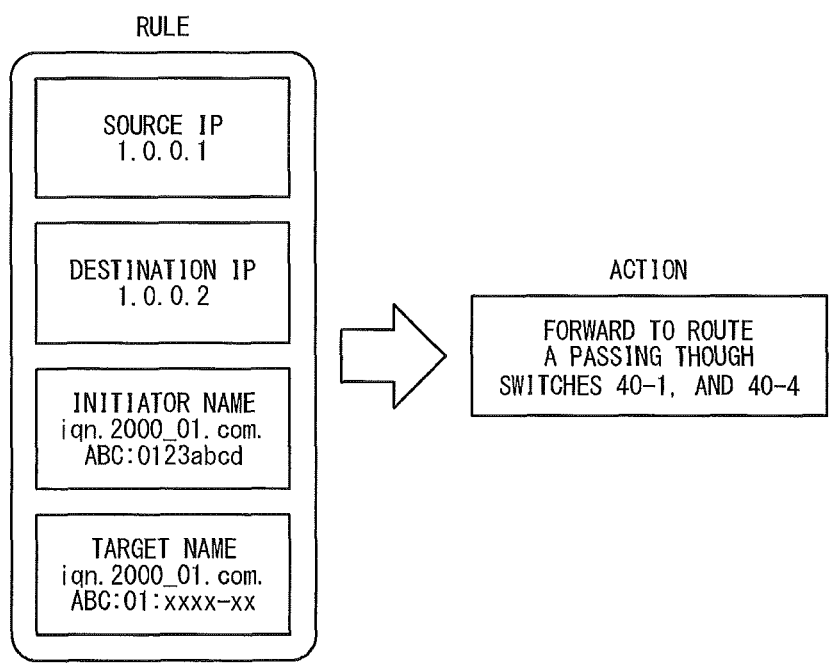
FIG. 8 is a diagram showing one example of a flow entry (rule+action) set in an open flow controller according to the present invention.

FIG. 8 is a diagram showing one example of a flow entry which is set in the switch 40 by the controller 300 (the flow control section 32). In the present invention, protocol information within the layer 4 and above the TCP layer is able to be the rule. In an example shown in FIG. 5, a flow entry is set in switches 40-2, 40-4 on a route A, including a rule which is a combination of an IP address and the iSDSI name of iSCSI layer above TCP layer, and a action which is to forward packets according to the rout A as the communication route. Specifically, source IP address "1.0.0.2", destination IP address "1.0.0.2", initiator name "iqn.2000-01.com. ABC: 0123abcd", and target name "iqn.2000-01.com. ABC:01: xxxx-xx" are defined as the rule, and "outputting this packet to the destination port number for forwarding to rout A" is defined as the action.

The switch 40 determines a method (the action) of processing the received packet, according to the flow entry which is set (updated) by the controller 300. For example, as the action for the received packet, forwarding to another switch 40, and cancelling the packet are illustrated.

Figure 9:
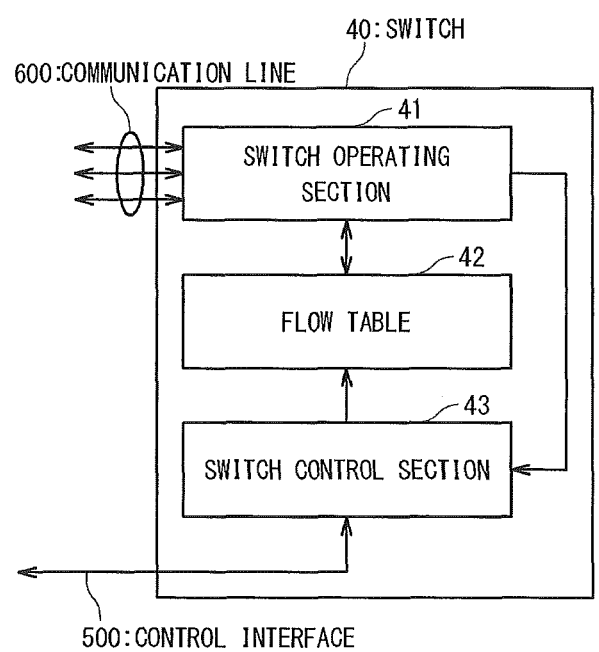
FIG. 9 is a diagram showing one example of a configuration of an open flow switch according to the present invention.

FIG. 9 is a drawing showing one example of a configuration of a switch 40 according to the present invention. With reference to FIG. 6, the switch 40 includes a switch operating section 41, a flow table 42, and a switch control section 43. The switch operating section 41 accommodates the line 600, and realizes a switching function for a packet which is forwarded through the accommodated line 600. The switch control section 43 is connected with the controller 300 through the control interface 500, and sets the flow entry in the flow table 42 in accordance with an instruction from the controller 300. The switch operating section 41 determines operation for the received packet in accordance with the flow entry which is set in the flow table 42. Specifically, when a rule complying with the header information of the received packet is set in the flow table, the switch operating section 41 executes an action defined in the flow entry which includes the complying rule. On the other hand, when the rule complying with the header information of the received packet is not set in the flow table 42, the switch operating section 41 informs the switch control section 43 of this packet data as a first packet. The switch control section 43 sends the first packet to the controller 300 through the control interface 500.

Here, when searching a flow entry complying with the received packet, the switch operating section 41 according to the present invention uses not only the header information defined in patent literature 1 but also information within the option area of the TCP header. For example, when receiving the packet 210 shown in FIG. 2, the switch operating section 41 extracts not only the IP layer header 114 and the TPC layer header 113 but also the iSCS information 115 that is stored in the option area of the TCP layer header 113 to check with (the rule of) the flow entry registered in the flow table 42. Here, when the flow entry, in which protocol information corresponding to the iSCSI information 115 is defined as the rule, is set in the flow table 42, the switch operating section 41 is able to forward the received packet to a forwarding destination in accordance with this flow entry. In this case, the received packet is forwarded to a communication route corresponding to the iSCSI information 115.

Alternatively, the switch operating section 41 may reference to the option area of the TCP layer header 113 to confirm the iSCSI information 115, if there is header information of a specified protocol. For example, such condition for confirming the iSCSI information 115 is preferably set along with registration of the flow entry by the controller 300.

As mentioned above, in the computer system according to the present invention, communication control (flow control) between an initiator and a target which are defined by a protocol within the layer 4 and the above TCP layer (for example, iSCSI protocol) is realized by the open flow protocol. For example, since communication connection to a specified target is able to be controlled by the controller 300, the flow is able to be easily changed when the target is moved. Moreover, an addition or expansion of the target is able to be easily processed.

Figure 10:
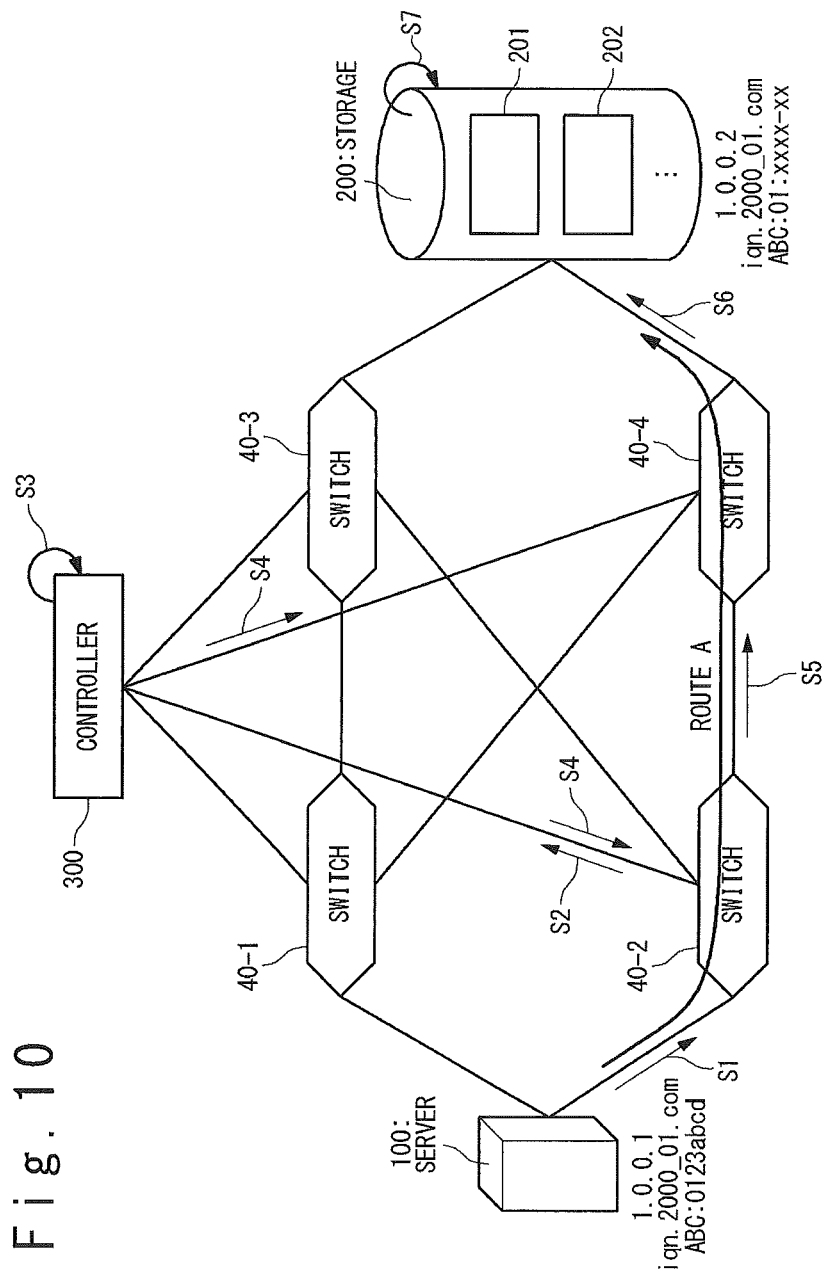
FIG. 10 is a diagram showing one example of a packet forwarding operation in a computer system according to the present invention.

(Operation) With reference to FIG. 10, details of packet forwarding operation in the computer system according to the present invention will be explained. FIG. 10 is a diagram showing one example of a packet forwarding operation in the computer system according to the present invention. Here, as one example, an operation will be explained, in a case that the packet 210 including the TCP header shown in FIG. 4A is forwarded from the initiator 101-1 to the target 201-1.

With reference to FIG. 10, the initiator 101 forwards the packet 210 in which the initiator name and the target name are stored in an option area of the TCP header (Step S1). In the present invention, the initiator 101 in iSCSI layer specifies data of the option area, when transferring forwarded data toward the TCP layer. In this case, as the data of the option area, iSCSI information 115 (initiator name and target name) in the data design shown in FIG. 4A is specified.

The packet 210 transferred from the initiator 101 is firstly inputted into the switch 40-2. The switch 40-2 confirms whether or not the flow entry which complies with the received packet 210 is registered in its own flow table 42. In here, it is confirmed whether or not the header information of the packet 210 from the layer 1 to the TCP layer of the layer 4 (including the option area) is complied with a rule set in the flow table 42.

When the flow entry concerning the packet 210 is not registered in the flow table 42, the switch 40-2 sends the packet 210 to the controller 300 as the first packet (Step S2).

The controller 300 calculates a forwarding route of the packet 210 based on the notified header information of the packet 210, and sets the flow entry in the switches 40 (Steps S3, S4). In detail, the controller 300 refers to the option area of the TCP header to confirm that the iSCSI information 115 is stored. Thus, the controller 300 recognizes that the packet 210 is data which follows the iSCSI protocol. Next, the controller 300 calculates a communication route between end points which are specified based on the iSCSI information 115 and other header information which are stored in the packet 210 (for example, the IP address and the MAC address) (Step S3). Subsequently, the controller 300 sets, in switches on the communication route, a flow entry in which the rule is a combination of the iSCSI information 115 and the other header information and the action is forwarding to the calculated communication route (Step S4).

In the present example, at a calculation phase for the communication route, a route reaching the storage 200 via the switch 40-4 (assumed to be route A) is selected such that a route length becomes the shortest. Moreover, the controller 300 defines this route such that the switch recognizes the route by information including the source IP address, the destination IP address, and the initiator name and target name of the option area of the TCP header. In this case, for example, as shown in FIG. 8, a flow entry is set in the switches 40-1, 40-2 on the communication route, defining "Referencing to the TCP option area when the source IP address is 1.0.0.1 and the destination IP address is 1.0.0.2, and sending to the route A when the initiator name is iqn.2000-01.com.nec:0123abcd and the target name is iqn.2000-01.com.nec:01:xxxx-xx". Here, the output destination of the packet 210 set in the switch 40 depends on the switch, and for example, a port number which is the output destination for the calculated route is defined in the action.

According to the setting of the flow entry, the switches 40-2 and 40-4 reference to the option area to check with the flow entry, with respect to a packet in which a source IP address is 1.0.0.1 and a destination IP address is 1.0.0.2.

The switch 40-2 outputs the packet 210 to the route A according to the flow entry which is set by the controller 300 (Step S5). In this case, the switch 40-2 outputs the packet 210 through a port which is connected to the switch 40-4 on the route A. Since the source IP address is "1.0.0.1" and the destination address is "1.0.0.2" in the received packet 210, the switch 40-4 refers to the option area of the TCP header. In this case, the option area includes an initiator name of iqn.2000-01.com.nec:0123abcd and a target name of iqn.2000-01.com. nec:01:xxxx-xx. Accordingly, the switch 40-4 judges that the received packet complies with the flow entry which is set at the Step S4, and outputs the packet 210 to the route A that is defined by this flow entry (Step S6). In this case, the switch 40-4 outputs the packet 210 through a port connected to the storage 200 on the route A.

The storage 200 refers to the data area 211 of the received packet 210 to confirm the target name, and outputs it to the corresponding target 201 (Step S7). Alternatively, the storage 200 may refer to the option area of the TCP layer header 113 in the received packet 210 to confirm the target name. In this case, since it is not necessary for the initiator to insert a target name in the data area 211, a storage area of the data area 211 is able to be larger than that of the conventional packet 110.

In this case, the packet 210 is sent to a target 201-1 which has the target name of "iqn.2000-01.com.nec:01:xxxx-xx" that is included in the packet 210.

When an SCSI command is included in the packet 210, the target 201-1 encapsulates a response in a packet, records own target name and an initiator name of the source in the TCP layer header 113 as the iSCSI information 115 as mentioned above, and sends it toward the server 100. Since a procedure for forwarding the packet 210 is similar to the above, an explanation will be omitted.

After that, a TCP/IP packet communication is carried out between the initiator 101-1 and the target 201-1, via the rout A which is set by the controller 300.

As mentioned above, in a computer system according to the present invention, since the flow is controlled for each of initiators and targets with using the open flow protocol, the following effects are obtained.

(1) In a configuration where a plurality of the logical disks is provided as targets with respect to one initiator, a flow is able to be controlled for each of targets.

(2) In a scalable configuration, when the IP address of the target is changed (when a logical disk which is the target transfers among physical storages, or the like), the flow can be adaptively controlled. In this case, the controller 300 carries out calculation of a new communication route and setting the flow entry based on information about changed destination, refers to the route information 33 and the flow table 34 to specify a communication route and a flow entry which are not necessary, and deletes them from the switch.

(3) Similarly, in a scalable configuration, when the IP address of the initiator is changed (when the initiator transfers among physical servers, or the like), the flow can be adaptively controlled.

(4) A route can be adaptively selected, even in a case of using a network in which a packet other than the iSCSI flows, such as LAN or WAN, or a case of using a netlike network.

As mentioned above, details of the embodiments according to the present invention has been explained, however, a specific configuration is not limited in the above mentioned embodiments, and the present invention may also include a configuration modified within a range without departing from a spirit of the present invention. For example, in the above-mentioned embodiments, a flow is recognized and controlled by the combination of the iSCSI name and the IP address, however, the flow may be controlled by a rule which is a combination with a MAC address or port number, which is other than the IP address.

Further, in the above-mentioned embodiments, a case has been explained in which the flow is controlled by the flow entry which specifies a forwarding destination port with respect to the switch on the route. However, the present invention is not limited by this. The switch 40 according to the present invention is able to determine the forwarding destination with using the iSCSI information 115, since being able to reference to the option area of the TCP header to recognize the iSCSI information 115. Accordingly, the controller 300 is able to carry out flow control in accordance with the iSCSI name, by setting flow entries which have been set in all switches 40 (in FIG. 1, switches 40-1 to 40-2) based on the first packet. Further, a policy specifically used for selecting the route at Step S40 may be changed based on implementation.

Moreover, a plurality of servers 100 and a plurality of storages 200 may be provided in the system, and numbers of the switches 40, initiators 101 and targets 201 are not limited in the above mentioned examples. Furthermore, the initiator 101 or the target 201 may be mounted on a computer device (host) which realizes a function other than a server or storage.

This application is based upon Japanese patent application No. 2011-052130, and the disclosure of which is incorporated herein in by reference.

The invention claimed is:

1. A computer system, comprising:
an open flow controller;
open flow switches each of which is configured to carry out a relaying operation for a received packet which complies with a flow entry set by the open flow controller, in accordance with the flow entry; and
a host connected to the open flow switches,
wherein the host is configured to send the packet in which an iSCSI (Internet Small Computer System Interface) name within a transport layer and above a TCP (Transmission Control Protocol) layer is stored in an option area of a TCP header,
wherein the open flow controller is configured to set the flow entry which defines a forwarding destination corresponding to the iSCSI name, in each of the open flow switches, and
wherein the each open flow switch is configured to forward the received packet to the forwarding destination in accordance with the flow entry which complies with the iSCSI name included in the TCP header of the received packet.

2. The computer system according to claim 1, wherein the iSCSI name identifies a destination host that is a target, and
wherein the open flow controller is configured to set the flow entry which defines the forwarding destination corresponding to the iSCSI name, in each of the open flow switches arranged on a route connecting the host and the destination host.

3. The computer system according to claim 2, wherein the iSCSI name includes only an initiator name, or includes only a target name.

4. The computer system according to claim 2, wherein the destination host comprises a logical disk.

5. The computer system according to claim 1, wherein the iSCSI name identifies a destination host that is a target.

6. The computer system according to claim 1, wherein the host is configured to send the packet in which protocol information includes the iSCSI name.

7. A server used as a host in a computer system, wherein the computer system comprises:
an open flow controller;
open flow switches each of which is configured to carry out a relaying operation for a received packet which complies with a flow entry set by the open flow controller, in accordance with the flow entry; and
the host connected to the open flow switches,
wherein the host is configured to send the packet in which an iSCSI (Internet Small Computer System Interface) name within a transport layer and above a TCP (Transmission Control Protocol) layer is stored in an option area of a TCP header,
wherein the open flow controller is configured to set the flow entry which defines a forwarding destination corresponding to the iSCSI name, in each of the open flow switches, and
wherein the each open flow switch is configured to forward the received packet to a forwarding destination in accordance with the flow entry which complies with the iSCSI name included in a TCP header of the received packet.

8. An open flow controller used in a computer system, wherein the computer system comprises:
the open flow controller;
open flow switches each of which is configured to carry out a relaying operation for a received packet which complies with a flow entry set by the open flow controller, in accordance with the flow entry; and
a host connected to the open flow switches,
wherein the host is configured to send the packet in which an iSCSI (Internet Small Computer System Interface) name within a transport layer and above a TCP (Transmission Control Protocol) layer is stored in an option area of a TCP header,
wherein the open flow controller is configured to set the flow entry which defines a forwarding destination corresponding to the iSCSI name, in each of the open flow switches, and
wherein the each open flow switch is configured to forward the received packet to a forwarding destination in accordance with the flow entry which complies with the iSCSI name included in a TCP header of the received packet.

9. Each of open flow switches used in a computer system, wherein the computer system comprises:
an open flow controller;
the open flow switches each of which is configured to carry out a relaying operation for a received packet which complies with a flow entry set by the open flow controller, in accordance with the flow entry; and
a host connected to the open flow switches,
wherein the host is configured to send the packet in which an iSCSI (Internet Small Computer System Interface) name within a transport layer and above a TCP (Transmission Control Protocol) layer is stored in an option area of a TCP header,
wherein the open flow controller is configured to set the flow entry which defines a forwarding destination corresponding to the iSCSI name, in each of the open flow switches, and
wherein the each open flow switch is configured to forward the received packet to a forwarding destination in accordance with the flow entry which complies with the iSCSI name included in a TCP header of the received packet.

10. A communication method, comprising:
sending a packet in which an iSCSI (Internet Small Computer System Interface) name within a transport layer and above a TCP (Transmission Control Protocol) layer is stored in a TCP header, by a host;
setting a flow entry which defines a forwarding destination corresponding to the iSCSI name, in each of open flow switches, by an open flow controller; and
forwarding the received packet to the forwarding destination in accordance with the flow entry which complies with the iSCSI name included in the TCP header of the received packet, by the each open flow switch.

11. The communication method according to claim 10, wherein the protocol information includes the iSCSI name which identifies a destination host that is a target, and
    wherein the open flow controller is configured to set the flow entry which defines the forwarding destination corresponding to the iSCSI name, in each of the open flow switches arranged on a route connecting the host and the destination host.

12. The communication method to claim 11, wherein the ISCSI name includes only an initiator name, or includes only a target name.

13. The communication method according to claim 10, wherein said sending a packet includes storing the iSCSI name in an option area of the TCP header to generate the packet, by the host.

\* \* \* \* \*